United States Patent Office 3,531,940
Patented Oct. 6, 1970

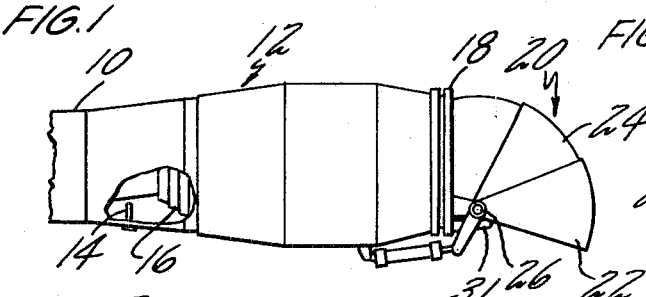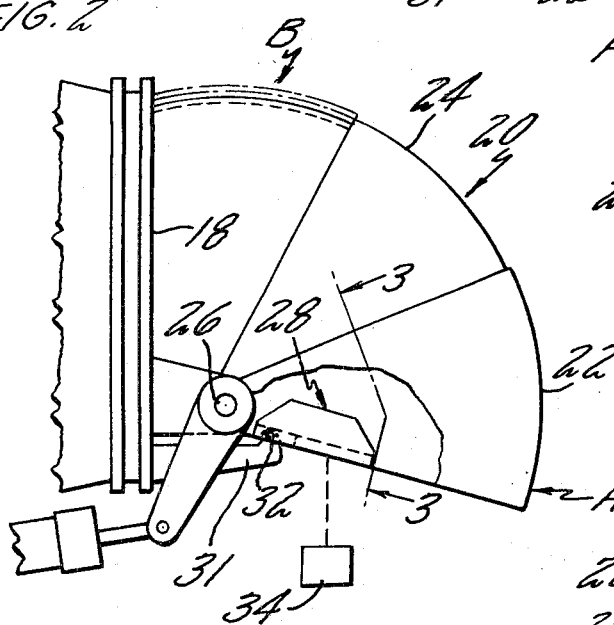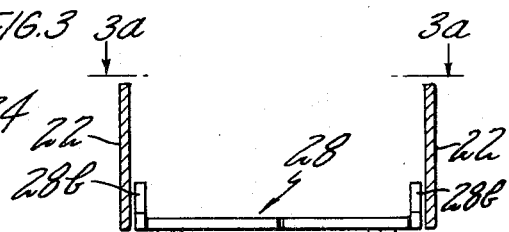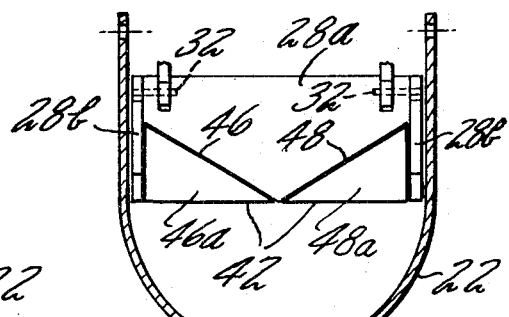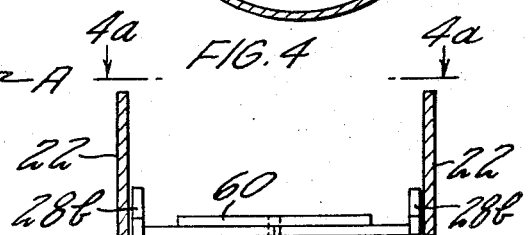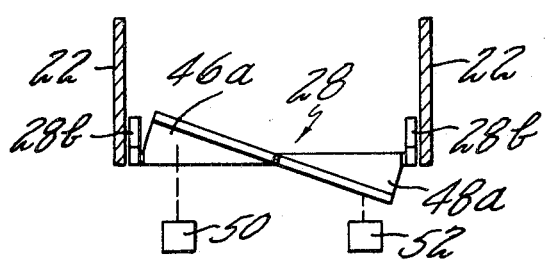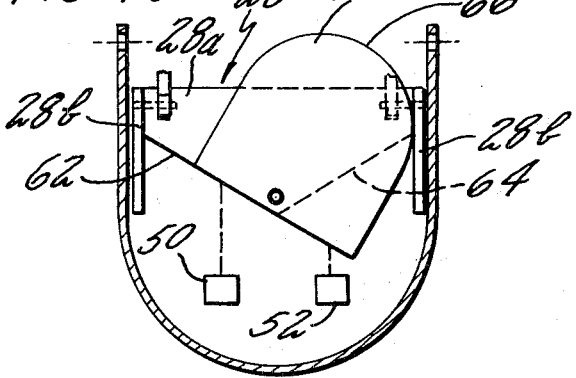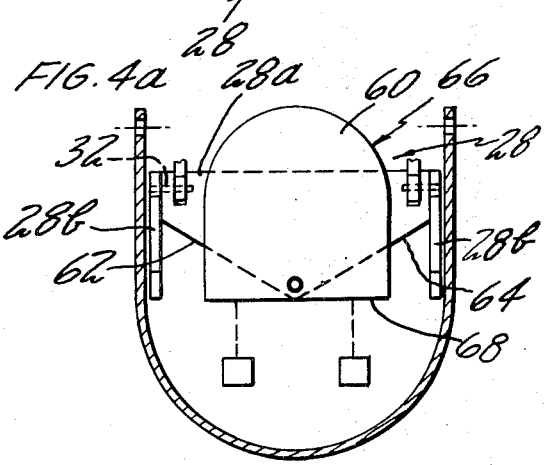

3,531,940
YAW CONTROL IN AN AFT HOOD DEFLECTOR
Stanley J. Markowski, East Hartford, Conn., assignor to United Aircraft Corporation, East Hartford, Conn., a corporation of Delaware
Filed Jan. 26, 1968, Ser. No. 701,006
Int. Cl. F02k 1/20
U.S. Cl. 60—230
11 Claims

ABSTRACT OF THE DISCLOSURE

A deflector exhaust construction capable of use with or without an afterburning gas turbine which has the capability of providing efficient vertical thrust deflection capability while simultaneously providing instantaneous yaw control for the aircraft.

---

This application is reportable as a Subject Invention under Government contract AF33(657)15786.

BACKGROUND OF THE INVENTION

This invention relates to a device in an exhaust deflection apparatus for simultaneously varying the area of the exhaust deflection apparatus and providing yaw control of the aircraft.

With the advent of vertical take-off and landing aircrafts, the requirement has arisen whereby the exhaust stream of the engine should be directed in a downward direction for at least a part of the flight regime. Several significant problems are encountered in deflecting the normally axial or horizontal flow from a gas turbine engine in a downward direction, these problems being magnified when it is desired to use an afterburner with the engine. Some of the problems encountered in deflecting the stream are the avoidance of engine suppression, the maintaining of a high velocity coefficient for the deflected stream, that is, a high efficiency for the deflected stream, and minimizing the turning losses. One scheme of avoiding some of the foregoing problems is described by the disclosure in U.S. application Ser. No. 545,995, now Pat. No. 3,380,660, entitled, Variable Area Exhaust Deflector, by S. J. Markowski filed Apr. 28, 1966.

The present invention provides two features which the prior art fails to or is incapable of providing. These features are the provision of varying the deflector exhaust while simultaneously providing yaw control of the aircraft during VTOL operation, the provision of yaw control during this period being mandatory; and, the capability of using an afterburner with the engine while satisfying the foregoing provisions, this capability being highly desirable as opposed to a mandatory requirement. While the use of an afterburner in conjunction with a deflection apparatus is known and is described in U.S. application Ser. No. 599,996, now Pat. No. 3,393,516 entitled Curved Exhaust Deflector by S. J. Markowski filed Dec. 5, 1966, the prior art is completely devoid of a deflection apparatus construction which permits the simultaneous varying of the discharge area of the exhaust deflector while providing a yaw control capability of the aircraft as the invention herein described does; and additionally, the present invention provides these capabilities in the engine which utilizes an afterburner.

SUMMARY OF THE INVENTION

It is a primary object of this invention to provide a deflection apparatus with a yaw force capability while simultaneously providing efficient vertical thrust deflection capability.

The present invention accomplishes the foregoing by providing a body with a particular configuration and which simultaneously varies the exhaust area of the deflecting apparatus. In a deflection apparatus without this body, the deflected air leaves the inner lip and outer radius of the deflection apparatus and forms a vena-contracta outside of the deflector. In expanding from the last edges of the deflector inner lip to form a free jet, the last increment of jet velocity does so to ambient pressure level and at essentially right angles to the discharge lip of the deflector, i.e., the last increment of velocity of the jet lies in a plane essentially orthogonal to the discharge lip. Since the deflector at the inner radius is circular in shape, velocity components lateral to the primary direction desired are produced. These lateral velocity components give the resultant deflected exhaust a fan-type distribution thereby contributing significantly to the inefficiency of the deflector, and additionally represent a lost increment of vertical thrust.

It has been found that these lateral velocity components can be generated and controlled and used to generate a yaw force component. To accomplish this, a body is provided in the deflection apparatus, the configuration of the body being such that the discharge edge thereof is either skewed or is skewable. The deflected stream as it leaves the skewed or skewable edge generates a resulting force which is opposite to the lateral velocity components thereby providing instantaneous yaw control of the aircraft. Therefore by utilizing the construction disclosed by the present invention, a deflecting apparatus which maintains a desirable velocity coefficient of the exhaust stream is provided, thus providing efficient vertical thrust deflection capability; and additionally, the present invention simultaneously provides an instantaneous yaw control of the aircraft.

BRIEF DESCRIPTION OF THE DRAWINGS

FIG. 1 is a sectional elevation view of the aft end of a jet engine incorporating the present invention in a deflecting position.

FIG. 2 is an enlarged sectional view of the segmented deflector exhaust.

FIG. 3 is a schematic illustration of the device of the invention substantially along line 3—3 of FIG. 2.

FIG. 3a is a view substantially along line 3a—3a of FIG. 3.

FIG. 3b is a schematic illustration of the device of the invention substantially along line 3—3 of FIG. 2 after the device has been actuated to a yaw control position.

FIG. 4 is a schematic illustration of a second embodiment of the invention taken substantially in the same position as FIG. 3.

FIG. 4a is a view substantially along line 4a—4a of FIG. 4.

FIG. 4b is a schematic illustration of the device of the invention in a yaw control position.

DESCRIPTION OF THE PREFERRED EMBODIMENT

Referring now to FIG. 1 and FIG. 2, the aft end of a jet engine 10 is illustrated. Although the details of engine 10 are not shown, engine 10 is of conventional design in which ambient air is drawn into a compressor and delivered in compressed fashion to a burner section where heat is added, the air being delivered to a turbine section where work is extracted and then discharged through an exhaust nozzle. Engine 10 may be either a non-afterburning type of engine or an afterburning type, the embodiment herein illustrated being of the afterburning type. As shown, afterburner 12 is located downstream of engine 10 and includes a plurality of spray bars 14 and flameholders 16. Although the present invention will be described in an environment which does not include an ejector or a blow-in-door structure, it will be expressly understood that the present invention may incorporate these structures, and in fact, the present invention may be used with any type jet engine.

Connected downstream of afterburner 12 at the engine housing mount 18 is a plurality of deflector segments 20. Each of the deflector segments 20 is substantially U-shaped in cross section with an arcuate end portion 22 and pie-shaped side segments 24 extending from a pivot 26 to the arcuate end portion 22. The plurality of segments 20 are articulated, and pivot 26 is a common pivot for all of the segments around which the segments rotate. As shown in FIG. 2, the deflected position of segments 20 is indicated by the solid lines designated by the reference character A and the stowed position of the segments 20 is indicated by the dotted line designated by the reference character B.

Also present within deflector 20 is a tongue-like body 28, this body being either fixed or movable and co-operating with at least one of deflector segments 22. Tongue-like body 28 includes a flat tongue floor portion 28a and side plates 28b, and one function of this body 28 is to vary the area of the deflector 20, and as previously noted this body may be either fixed or movable. If body 28 is a fixed body it is attached to engine amount 18 as by flange 31 and is always maintained in the position shown in FIG. 1. Additionally, it is extremely desirable, but not essential, that the side of body 28 exposed to the gas stream be substantially parallel to the axis of the gas stream. If body 28 is a movable body, it is movable generally in two directions; it may be moved to a stowed position, a position which is not shown herein, and it may be movable with respect to the plane of the discharge stream about pivot 32. Movement of body 28 around pivot 32 is acomplished by means of any well-known prior art actuator as indicated generally by 34, this latter type movement of body 28 about pivot 32 improving the engine suppression characeteristics. The plate 28b, in this embodiment, delay lateral flow spillage during the hood motion from the positions illustrated in FIGS. 3a and 3b.

A second function of body 28 is to provide yaw control of the aircraft. This is accomplished by providing skewable or skewed edges at the discharge side of the body 28. The two different configurations are shown in FIG. 3 and FIG. 4 which are sections viewed along line 3—3 of FIG. 2. In FIG. 2 a body with skewable edges at its discharge side is illustrated. In FIG. 2a body 28 therein ilustrated includes hinged pivot axes shown by lines 46 and 48 with tongue floor 28 having an edge 42. The body 28 is skewable by rotating the corner piece 46a and 48a of the deflector tongue floor 28a about hinge axes 46 and 48, while the tongue floor discharge edge 42 may be skewed between an angle of ±90° from its neutral, no yaw position, this angle being measured with respect to the deflector hinge axes 46 and 48. The two skewable corner pieces of body 28 are indicated by the numerals 46a and 48a, and FIG. 3 illustrates the position and shape of body 28 after sides 46a and 48a have been actuated by any appropriate actuating means, the actuator herein being illustrated in FIG. 1 and designated by the numerals 50 and 52.

A second configuration which will provide this yaw control feature is the embodiment illustrated in FIGS. 4, 4a and 4b. In FIG. 4a in addition to body 28, a pivotally connected cover 60 is used in conjunction with body 28, and tongue floor 28a. The construction of tongue floor 28a is such that its discharge sides are permanently skewed as indicated by 62 and 64, these edges being at the discharge side of the deflector with respect to the deflected stream. The configuration of cover 60 is that of a dome shape with a substantially flat edge, the dome being indicated by 66 and the substantially flat edge, which is also the discharge side of the cover, being indicated by 68. Additionally, the side of cover 60 exposed to the gas stream is substantially flat, that is, this side is substantially parallel to the axis of the gas stream. Cover 60 is connected to the tongue floor 28a such that when yaw control of the aircraft is not desired, the skewed edges of tongue floor 28a are inactive, or covered, and the gas stream exhausts from the substantially flat edge 68 of cover 60. However, when yaw control of the aircraft is desired, cover 60 is rotated by actuators 52 and/or 50, cover 60 assuming a position as indicated in FIG. 4b or positions intermediate between FIGS. 4a and 4b. It is to be understood that any rotation of cover 60 from the neutral position however slight will generate a yaw force and that the position indicated in FIG. 4b is just illustrative. More specifically, cover 60 does not have to be aligned with the skewed edges of tongue floor 28a to generate a yaw force. It is to be further understood that cover 60 may be either placed in top or below tongue floor 28a and yaw control will be achieved with either embodiment.

Whether the embodiment in FIGS. 3, 3a and 3b, or the embodiment in FIGS. 4, 4a and 4b is used, provision of the yaw control force is the same. More specifically, it has been found that as the deflected stream leaves body 28, the last increment of static pressure drop that forms the last increment of jet velocity does so to ambient pressure level at essentially right angles to the discharge edge of torque floor 28a. It was determined that this force in the orthogonal direction will always be present, and as a result, it was discovered that by skewing the discharge edge to a desired orientation, lateral velocity components are generated. It was further discovered that this lateral component could be generated in a preferred direction and that the reaction of this force imparted to the aircraft. It is pointed out that the lateral side components comprise only a relatively small fraction of the entire deflected thrust force. However, it is again reiterated that by intentionally inducing this side force caused by these lateral side components, an instantaneous yaw force is generated, the yaw force being the lateral component of the resultant entire deflected thrust vector force. It is to be noted that the yaw force is transmitted to the aircraft or engine structure directionally opposite to the direction of the lateral side velocity component which is generated by the skewed edges. Both embodiments herein illustrated provide yaw control in the foregoing manner.

While a preferred embodiment of the present invention has been shown, various modifications and substitutions may be made without departing from the spirit and scope of this invention. Accordingly, it is to be understood that this invention has been described by way of illustration rather than limitation.

What is claimed is:

1. A deflection device for a gas stream from an engine having a plurality of deflector segments, the segments being movable between a stored position and a deflecting position and defining a flow path with a discharge to ambient, wherein the improvement comprises;

a body cooperating with at least one of the segments, the body simultaneously providing a yaw control and defining the area of the discharge, at least one side of the body being skewable at its discharge edge with respect to the axis of the deflection device.

2. A construction as in claim 1 wherein;

the surface of the body exposed to the gas stream is substantially rectangular in cross section.

3. A construction as in claim 2 wherein;

the body is a fixed member so that when the segment is moved to a deflecting position, the fixed body cooperates therewithin.

4. A construction as in claim 1 wherein;

each skewable side of the body is skewable from an angle of greater than zero but not greater than ninety degrees with the discharge edge of the movable body.

5. A construction as in claim 1 wherein;
the body includes a floor having at least two skewable edges at its discharge side, each skewable edge being hinged along an axis on the floor of the body, each edge of the body being skewable from an angle of plus or minus 90 degrees with respect to the axis the hinge axis on tongue floor.

6. A deflection device for a gas stream from an engine having a plurality of deflector segments, the segments being movable between a stored position and a deflecting position and defining a flow path with a discharge to ambient, wherein the improvement comprises;
a body cooperating with at least one of the segments, the body simultaneously providing a yaw control and defining the area of the discharge, two sides of the body at its discharge edge being skewed with respect to the axis of the deflection device; and,
a rotatable cover pivotally connected to the body, the cover being rotatable from a neutral position, this position being where neither skewed edge is uncovered to either a right yaw or left yaw position, these positions being respectively where the left skewed edge or the right skewed edge is aligned with the discharge edge of the cover.

7. A construction as in claim 6 wherein;
the surface of the cover exposed to the gas stream is substantially rectangular in cross section.

8. In construction as in claim 6 wherein;
the skewed edges of the body form an angle of greater than zero but less than ninety degrees with the discharge edge of the cover.

9. In a gas turbine engine a deflection apparatus including a plurality of deflector segments, the segments being movable between a stored position and a deflecting position and means for moving said deflector segments to the deflecting position, the deflector segments cooperating in the deflecting position to define a flow path for the engine exhaust stream, wherein the improvement comprises;
a body cooperating with at least one of the segments, the body simultaneously providing a yaw control and varying the area of the discharge, two sides of the body at its discharge edge being skewed with respect to the axis of the deflection device;
means for moving the movable body relative to the deflector segment,
a rotatable cover pivotally connected to the body, the cover being rotatable from a neutral position, this position being where neither skewed edge is uncovered to either a right yaw or a left yaw position, these positions being respectively where the discharge edge of the cover is rotated with respect to the left skewed edge and the right skewed edge; and
means for pivoting the rotatable cover.

10. A construction as in claim 9 including;
an afterburner, having a plurality of fuel nozzles and flameholders is mounted upstream of the deflection apparatus.

11. A construction as in claim 9 wherein;
the skewed edges of the movable body form an angle of greater than zero but less than ninety degrees with the discharge edge of the cover; and
the cover is dome shaped at one end and essentially flat at the opposite end, the flat edge of the cover being the discharge edge and cooperating with the skewed edges of the movable body to provide the yaw control.

References Cited
UNITED STATES PATENTS

| | | | |
|---|---|---|---|
| 2,879,014 | 3/1959 | Smith et al. | 60—230 XR |
| 3,096,049 | 7/1963 | Karasinski | 60—230 XR |

FOREIGN PATENTS 1,144,117   2/1963   German.

CARLTON R. CROYLE, Primary Examiner

U.S. Cl. X.R.
239—265.39; 60—261